Feb. 5, 1963 H. P. KALMUS 3,076,376
ELECTRIC MEASURING CIRCUITS
Filed June 27, 1961 3 Sheets-Sheet 1

INVENTOR.
Henry P. Kalmus,
BY
Cromwell, Greist & Warden
Attys.

Feb. 5, 1963 H. P. KALMUS 3,076,376
ELECTRIC MEASURING CIRCUITS
Filed June 27, 1961 3 Sheets-Sheet 2
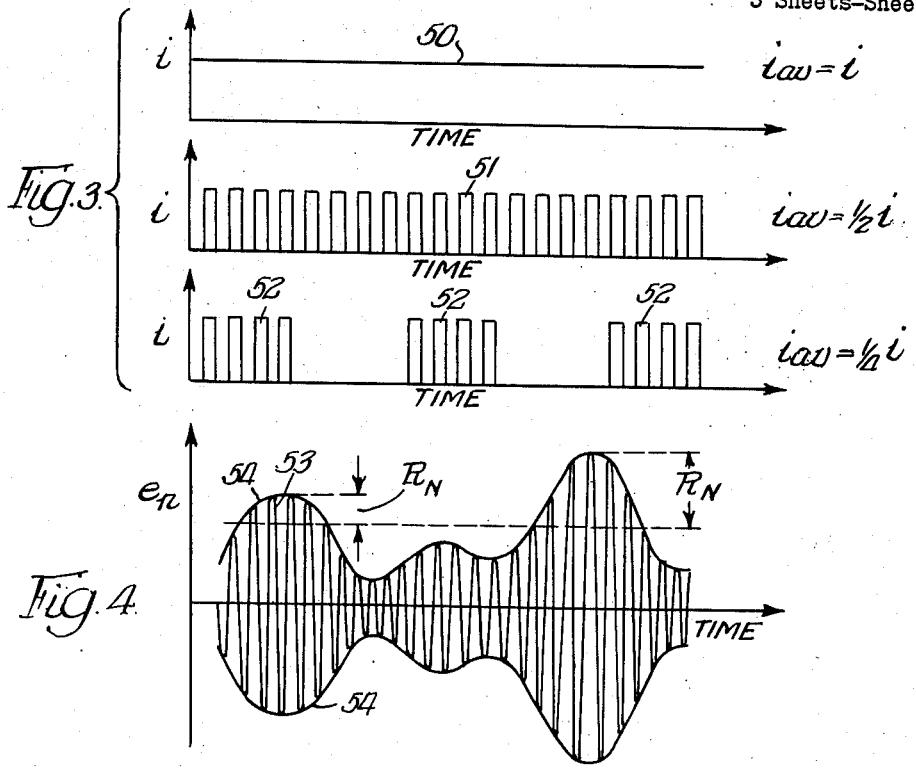
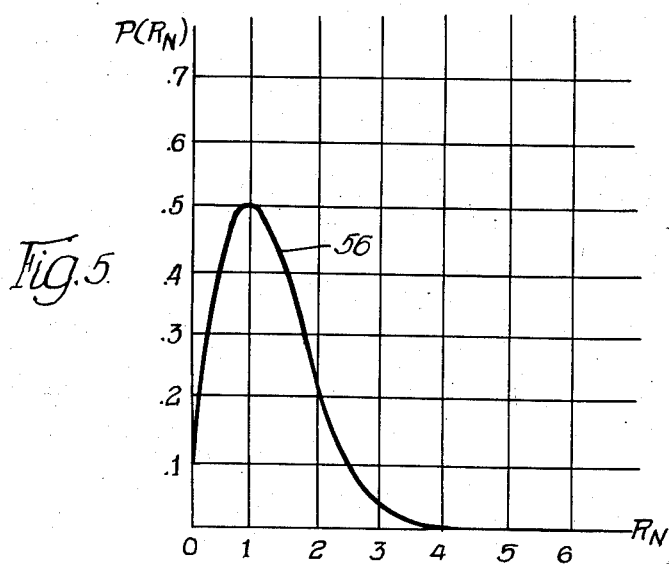
INVENTOR.
Henry P. Kalmus,
BY
Cromwell, Greist & Warden
Attys.

INVENTOR.
Henry P. Kalmus,
BY
Cromwell, Greist & Warden
attys.

United States Patent Office 3,076,376
Patented Feb. 5, 1963

3,076,376
ELECTRIC MEASURING CIRCUITS
Henry P. Kalmus, 3000 University Terrace NW.,
Washington, D.C.
Filed June 27, 1961, Ser. No. 119,898
15 Claims. (Cl. 88—23)

This invention relates, generally, to electric circuits and it has particular relation to such circuits employed for radiation measurements.

Vacuum phototubes provide exceedingly stable transducers for direct reading light measuring instruments. Using such devices for the determination of very low light levels the signal to noise ratio is important. The circuitry employed is selected to provide the best compromise between zero stability and time of response. While direct current methods provide the best signal to noise ratio, they have poor zero stability. Because of this some kind of modulation usually is employed.

In systems employing modulation there are two fundamental requirements. First, in order to maintain zero stability, the modulating wave potential should be decoupled from the amplifier input or should be prevented from affecting in any way the portion of the circuit that is employed for measuring purposes. Second, the dark current should not cause any deflection of the measuring instrument.

Accordingly, among the objects of this invention are: to provide a system for measuring radiation and similar phenomenon, such as light, ionization, magnetic field strength, etc., which system is capable of determining low current flow levels and at the same time maintaining zero stability; to provide such a system in which the dark current causes no meter deflection; to employ for this purpose a modulated carrier frequency which is applied across an electric valve, such as a phototube, connected in series with impedance means, such as a resistor, to vary the light applied to the phototube and to measure the same as reflected by the change in potential across the impedance means; and to prevent the application of the modulating frequency to the phototube while applying thereto only the carrier frequency and its sidebands.

Other objects of this invention will, in part, be obvious and in part appear hereinafter.

This invention is disclosed in the embodiments thereof shown in the accompanying drawings and it comprises the features of construction, combination of elements and circuit connections which will be exemplified in the systems hereinafter set forth and the scope of the application of which will be indicated in the appended claims.

For a more complete understanding of the nature and scope of this invention reference can be had to the following detailed description, taken together with the accompanying drawings, in which:

FIGURE 3 shows graphs which demonstrate the amount of signal current that is obtained employing different operating systems including the system shown in FIGURE 2;

FIGURE 4 shows curves which demonstrate the relationship between noise voltage and time;

FIGURE 5 shows a curve which indicates the relationship between the probability distribution of the envelope shown in FIGURE 4 and the actual voltage deviation;

Figure 1:
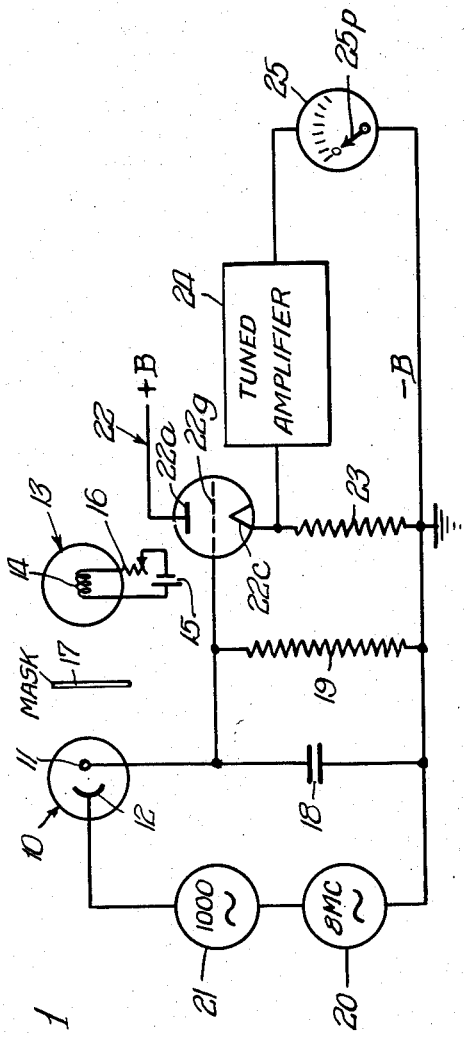
FIGURE 1 illustrates diagrammatically a measuring system embodying the present invention.

Referring now particularly to FIGURE 1 of the drawings it will be observed that the reference character 10 designates, generally, an electric valve such as a phototube, preferably of the vacuum type, having an anode 11 and a light sensitive cathode 12. Any suitable light source can be employed in conjunction with the phototube 10. For example, an incandescent lamp 13 is illustrated having a filament 14 which may be energized from a battery 15 through a variable resistor 16. Additional means for varying the light applied to the cathode 12 can be provided by a mask 17 which can be moved by any suitable means as is readily understood.

The phototube 10 forms a part of a circuit which is completed by impedance means comprising a capacitor 18 and a resistor 19 which, as shown, are connected in parallel circuit relation and in series circuit relation to the phototube 10, particularly to the anode 11 thereof.

In accordance with this invention, provision is made for applying a modulated carrier frequency across the phototube 10 and series connected impedance means comprising the capacitor 18 and resistor 19. For this purpose an alternating current generator 20 can be employed that is capable of generating a relatively high frequency, for example, a frequency of eight megacycles per second. Also, in accordance with this invention, the carrier frequency provided by the generator 20 is square wave modulated by a relatively low frequency, such as a frequency of 1,000 cycles per second, provided by an alternating current generator 21. It will be understood that the generators 20 and 21 can be any suitable type of generator. For example, electronic oscillators can be employed and the modulating frequency can be applied to the carrier frequency in any suitable manner.

In the circuit in which the phototube 10 is connected, it acts as a rectifier the internal impedance of which is a function of the amount of light that is applied to the cathode 12. When no light is applied to phototube 10, it acts with all its unavoidable leakage effects as a linear element having a resistivity essentially independent of applied voltage. Hence, no energy at the modulating frequency is developed. When light falls on cathode 12, the phototube 10 acts as a non-linear element so that a voltage at the modulation frequency is developed across resistor 19.

The potential thus applied across the resistor 19 is applied to a grid 22g of a cathode follower tube that is shown, generally, at 22. The cathode follower tube 22 has an anode 22a and a cathode 22c which is connected through a cathode follower resistor 23 to ground and to the other terminal of the resistor 19. Connected across the cathode follower resistor 23 is a tuned amplifier 24 having in series therewith a meter 25 preferably of the d'Arsonval type.

The system just described and shown in FIGURE 1 has good zero stability because any leakage effects in and around the phototube establish a linear resistance and the largest part of the dark current is of this nature. The part of the dark current which is due to the thermo-excitation of the phototube will produce a voltage at modulating frequency but this part is so small that it can be neglected. The modulation frequency applied by the generator 21 preferably is high enough to prevent shock and vibrations causing spurious signals and erroneous reading of the meter 25.

The carrier frequency energy must be prevented from appearing at the cathode follower grid in order to prevent demodulation in the tube. No electronic device has a perfect linear characteristic, so that if the modulated carrier frequency potential is permitted to pass, a voltage at modulation frequency would be produced by the cathode follower even when no light impinges on the phototube. In this invention I provide two means for protecting the input tube from carrier frequency energy: a neutralization means and a filter arrangement. This method of protection is shown in FIGURE 2.

Figure 2:
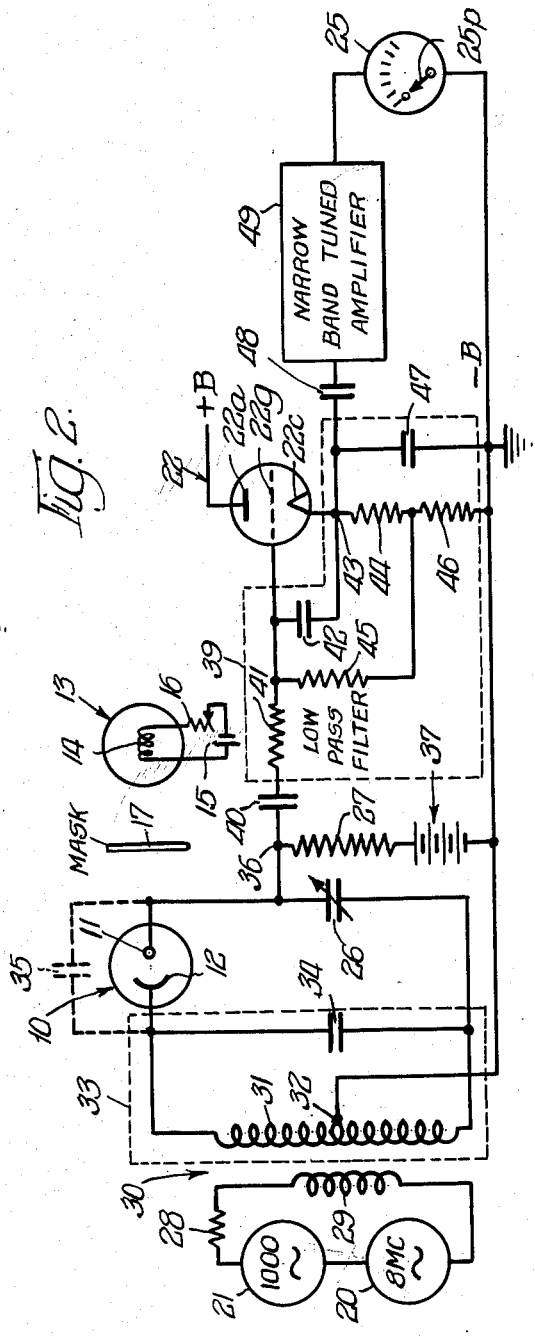
FIGURE 2 illustrates diagrammatically a preferred embodiment of the invention.

In the system shown in FIGURE 2 certain of the circuit elements in FIGURE 1 and described hereinbefore are employed. Insofar as possible the same reference characters are applied to the same elements. The modulated high frequency source including the generators 20 and 21 and the generator impedance 28 are coupled to a tuned circuit 33 through a coil winding 29. The tuned circuit 33 includes a coil winding 31 which is center tapped at terminal 32 and grounded with a capacitor connected in parallel with the winding 31. The function of the tuned circuit 33 is to pass freely the carrier frequency and the two side bands to the series connected phototube 10, but to block completely the potential at the modulation frequency. The method of coupling high frequency energy into the tuned circuit 33 is merely illustrative and other coupling methods can be employed.

A neutralizing capacitor 26 forms a part of the system to minimize carrier potential across a resistor 27. This resistor corresponds to the resistor 19 of the system of FIGURE 1 and terminates the phototube 10. The capacitor 26 here functions as a neutralizing capacitor and is adjusted so that its value is equal to the value of the distributed capacity, indicated by the broken line showing of a capacitor 35, across the terminals of the phototube 10. When this adjustment is made, the carrier potential at terminal 36 of the resistor 27 is minimized. A positive bias is applied by a battery 37 to the resistor 27 for a purpose that will be apparent presently.

In order to reduce further any carrier frequency potential at terminal 36, a low pass filter circuit shown at 39 is employed for blocking any voltage at the carrier frequency which might appear at grid 22g because of incomplete neutralization by the capacitor 26. Capacitor 40 couples the system described to this point with the low pass filter circuit 39 and while preventing a direct current potential at the grid 22g it permits an alternating current signal to pass freely. Resistor 41 and capacitor 42 act as a low pass filter blocking any potential at carrier frequency. Capacitor 42 does not reduce the input impedance at modulating frequency of the cathode follower because it is connected not to ground but to the cathode which at modulation frequency is essentially at grid potential. Connected across the sections 44 and 46 of the cathode follower resistor is a capacitor 47. It acts to by-pass any alternating current at the carrier frequency that might otherwise flow through the cathode follower resistors 44 and 46. The terminal 43 of the cathode follower resistor 44 is connected through a capacitor 48 to a narrow band tuned amplifier 49 which in turn is connected to the meter 25 previously described.

The system shown in FIGURE 2 permits the envelope potential to pass freely to the cathode follower 22 the output of which is applied to the narrow band tuned amplifier 49 as described. The band width of the amplifier 49 is kept small by means of tuned elements and synchronous rectification. At low light values the phototube 10 has a very high internal resistance and it can be assumed to represent a constant current generator under the operating conditions described. The signal voltage for the cathode follower 22 is provided as a voltage drop through the resistor 27. The resistor 27 constitutes a load resistance and its resistance can be designated as $R_L$. For the optimum signal to noise ratio $R_L$ should be as high as possible. The reason for this is that the signal is a function of $R_L$ while the noise is a function of $\sqrt{R_L}$. It will be seen, therefore, that the signal to noise ratio is a function of $\sqrt{R_L}$. The noise developed in the cathode follower 22 and across the sections 44 and 46 of the cathode follower resistor can be neglected.

In the actual instrument or measuring system, the load for the phototube 10 is complex, i.e., it is a resistance shunted by a capacitance. Now, if the load is represented by $Z_L$ equals $(a+jb)$, the signal is proportional to $\sqrt{a^2+b^2}$ and the noise is, according to Nyquist's theory, proportional to $\sqrt{a}$. It can easily be shown that the signal to noise ratio is still proportional to $\sqrt{R_L}$ and that the shunting capacitor 26 has no detrimental effect. Its capacitance should, however, be kept as small as possible in order to obtain as high a signal voltage as possible so that the fluctuation noise and microphonics in the amplifier 49 can be neglected. In the cathode follower 22, the potential difference between cathode 22 and the ground is almost equal to the voltage applied to the grid 22g so that the capacitance of capacitor 42 appears highly reduced to the 1,000 cycle signal. For the same reason all electrostatic shields should also be connected to the cathode 22c.

It is interesting to compare the signal to noise ratio of the double modulation method of the present invention with other systems. It is assumed that square wave modulation is applied and that the phototube 10 acts as an ideal rectifier. It is further assumed that, after synchronous rectification, the indication of the meter 25 is proportional to the average current resistor 27 having a resistance $R_L$.

FIGURE 3 shows at 50 the signal current in a conventional direct current system, if the dark current is neglected. Here the average current ($i_{av}$) equals the signal current ($i$). When either a light chopper or a magnetic switch device is employed the square topped waves shown at 51 are produced. In this case the average current ($i_{av}$) equals one-half of the signal current ($\frac{1}{2}i$). The signal to noise ratio is reduced by 6 db. When double modulation is used in accordance with this invention, it can be seen that a further reduction by 6 db has to be accepted since the square topped waves 52 are only half the number shown at 51 and the average current ($i_{av}$) is one-fourth the signal current ($\frac{1}{4}i$). In practice, however, the two alternating current methods shown at 51 and 52 are very similar because of the greater flicker-effect and microphonic disturbances which are unavoidable in the low frequency amplifier if magnetic modulation is used.

Vacuum phototubes have two knees in their voltage-current characteristics. Either one can be used for demodulation, but it can be shown that the one at saturation level produces higher rectification efficiency. Hence, a positive bias is produced by the battery 37.

The internal impedance of the phototube 10 is directly proportional to light intensity so that good linearity of the system can be maintained. In this respect, the method of the present invention has the same operating characteristics as the conventional direct current method.

In order to determine the fluctuations of the meter 25 in a system using an amplifier 49 with a bandwidth of 1 cycle per second, the signal and noise voltages will be calculated for a full deflection sensitivity of .1 microlumen. A circuit as shown in FIGURE 2 was employed. The total capacitance for the 1,000 cycle wave, measured between point 36 and ground, was $8\mu\mu$ F. The load resistor 27 was 40 megohms. Capacitor 42 and resistor 45 can be neglected because, as was mentioned before, these elements are connected to the cathode 22c of the cathode follower tube 22. The total load impedance Z is represented by $(a+jb)$. Resistor 27, referred to by its value $R_L$, is shunted by $$x=\frac{1}{wc}$$

Hence:

$$Z=a+jb=\frac{R_L jx}{R_L+jx}=\frac{R_L x^2}{R_L^2+x^2}+j\frac{R_L^2 x}{R_L^2+x^2}$$

The signal producing load is:

$$Zs = +\sqrt{a^2+b^2} = \sqrt{1+\left(\frac{R_L}{x}\right)^2}$$

The noise producing load is:

$$Zn = a = \frac{R_L}{1+\left(\frac{R_L}{x}\right)^2} \text{ and } x = -\frac{1}{wc}$$

$= -20$ megohms for 1,000 cycles per second

Hence:
$Zs = 18$ megohms
$Zn = 8$ megohms

Assuming a phototube sensitivity of $40\mu_A/l$, a phototube current of $iDC = 4.10^{-12}$ amp. is obtained for an illumination of .1 microlumen. At room temperature, the noise voltage $E_n$, produced by a resistor having a resistance of $Z_n$ and employing an amplifier 49 with a bandwidth of $\Delta f$ cycles/sec. is:

$$E_n = 1.3 \cdot 10^{-10} \sqrt{Z_n \Delta F} \text{ volts}$$

Assuming a bandwidth of 1 cycle, the following is obtained:

$$E_n = .4\mu v$$

FIGURE 4 shows the instantaneous noise voltage $e_n$ plotted against time. It consists of a carrier 53 with random phase and random amplitude, whose root mean square value is $E_n$. This noise carrier appears to be modulated by an envelope 54—54 at an average frequency of ½ cycle per second with random phase and random amplitude. After detection in a synchronous rectifier in the amplifier 49, the pointer 25p of the meter 25 follows the noise envelope 54. These pointer fluctuations are of great importance because they determine the zero stability of the instrument. The probability distribution of the envelope of $E_n$ is:

$$P(R_N)dR_N = \frac{R_N}{E_n^2 l} - \frac{R_N^2}{2E_n^2 dR_n}$$

This curve 56 is plotted in FIGURE 5 wherein an effective noise voltage of $E_n = 1$ volt is assumed. The probability for the occurrence of an amplitude between 3 and 4 volts is determined by the ratio of the area under the curve 56 between abscissae 3 and 4 to the total area under the curve. Hence, it can be seen that this probability is about 2% and this means that in the average, every fiftieth excursion of the pointer 25p will reach a value between 3 and 4 volts. Practically no excursions with a higher value will occur. About 50% of all excursions will have a value of 1 volt. Applying this to the assumed conditions with an effective noise voltage of $.4\mu v.$, and no light impinging on the phototube 10, 50% of all fluctuations of the pointer 25p will have values proportional to $.4\mu v.$ and 2% will be proportional to about $1.4\mu v.$ Because the bandwidth of the amplifier 49 is 1 cycle second under the assumed conditions, the fluctuations of the pointer 25p due to the noise follow each other on the average with 2 second intervals so that the largest deflections will be spaced by about 100 seconds. For a light flux of .1 microlumen, the deflection of the pointer 25p is proportional to $18\mu v$. The zero stability of the meter 25 is, therefore, sufficient especially if a synchronous detector is applied so that the noise envelope amplitudes are distributed uniformly on both sides of the zero marking. If simple linear detection were used, the fluctuations would occur only on one side and would make an accurate estimate of the zero position impossible.

The double modulation method of the present invention is not limited to the measurement of radiation but can be applied whenever nonlinear effects are produced by the phenomenon which is to be determined. In a hot wire vacuum gauge, for instance, the unidirectional cathode grid conduction can be employed as a demodulator of the modulated carrier wave. A system of this type is shown in FIG. 6 wherein the double modulation system illustrated is based on the arrangement of FIG. 1, it being understood that the arrangement of FIG. 2 is equally applicable.

Figure 6:
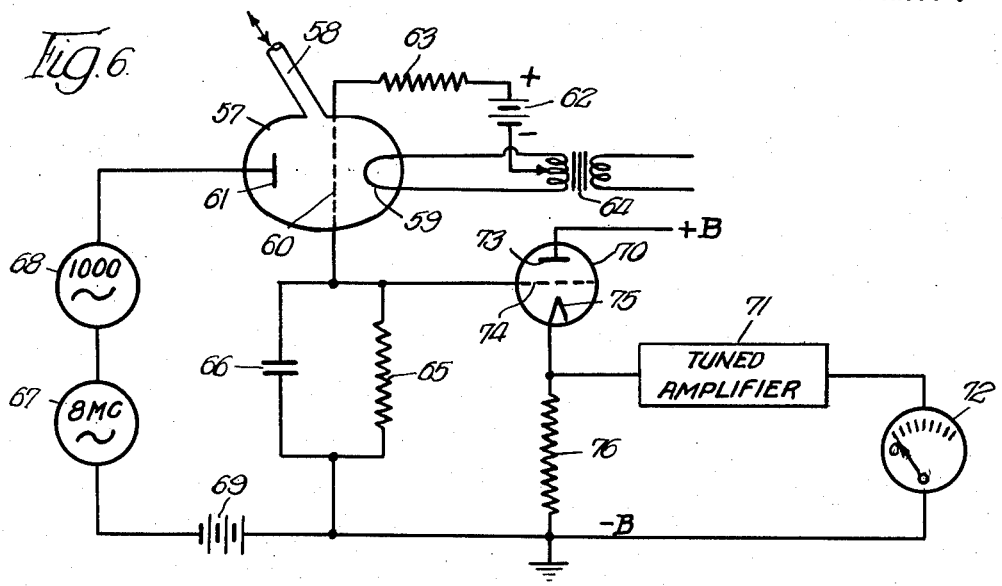
FIGURE 6 illustrates diagrammatically the measuring system of the invention applied to a vacuum or gas pressure system.

The system of FIG. 6 includes a sealed vessel or tube 57 in the form of a diode-type gauge provided with a connecting passage 58 leading to a vacuum or pressure system (not shown) in which gas pressure is to be measured, observed or controlled. The vessel 57 is provided with a filament 59, a grid 60 and an anode 61. A grid bias supply 62 is connected through a load resistor 63 to the grid 60. A variable A.C. power source 64 (such as 60 cycles) determines the operating point of the vessel 57 through the filament 59 and the grid 60 is terminated thereby in reference to the filament 59 through the load resistor 63. In all other respects the system of FIG. 6 is similar to the system of FIG. 1 as it includes an internal impedance 65 connected in series with the grid 60 and combined with a by-pass capacitor 66, generators 67 and 68 for applying a modulated carrier frequency across the vessel 57, an anode bias supply 69, a grid follower tube 70, a tuned amplifier 71 and a meter 72. Along lines previously described, the follower tube 70 includes an anode 73, a grid 74 to which the potential across the resistor 65 is applied, and a cathode 75 which is connected through a cathode follower resistor 76 to ground and to the other terminal of the internal impedance including the resistor 65 and capacitor 66.

Utilization of the various biasing sources described provides for the grid 60 of the vessel 57 being positive with respect to the negative filament 59, the anode 61 also being negative. In the absence of gaseous ions within the vessel 57, only electron flow exists, this flow being created through the tube biasing circuit including the power source 62 and resistor 63. Electron flow exists from the filament 59 to the grid 60 and no electrons flow to the anode 61. When gas having positive ions is present in the vessel 57, the electron flow existing between the filament and grid excites the ions and the same are driven toward and collected on the anode 61 which has a negative potential. Vessel operating electron flow is repelled by reason of the biased condition of the vessel. When ion current is present, a signal is developed across the internal impedance 65 and current is measured by the system with the meter 72 being calibrated to indicate the supply of gas existing in the vessel 57.

Figure 7:
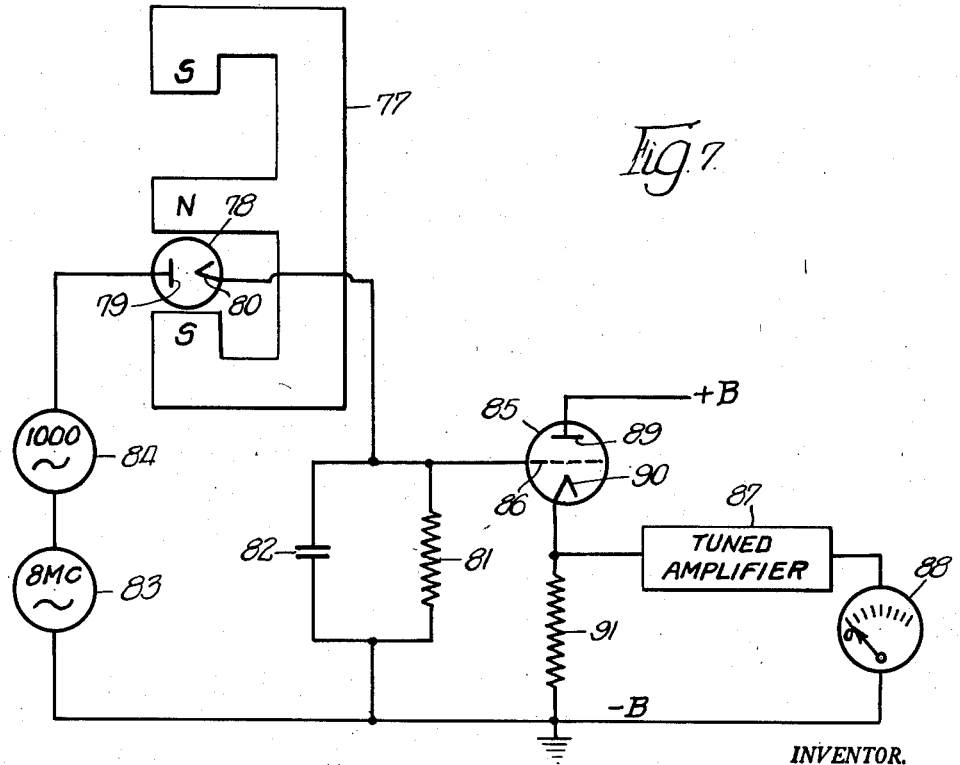
FIGURE 7 illustrates diagrammatically the use of the measuring system of the invention in magnet field strength testing.

The double modulation system of the invention is adapted for a number of other applications such as the measurement of the field strength of different types of permanent or electro-magnets. FIG. 7 illustrates this particular application in connection with a permanent magnet 77 of the type used in a speaker cone. This magnet includes a center pole defining field gaps between adjacent opposite poles. The double modulation system of the invention includes the use of a sub-miniature diode 78 having an anode 79 and cathode 80. The diode circuit includes the internal impedance previously described comprising a resistor 81 in parallel with a capacitor 82 terminating the diode circuit which further includes generators 83 and 84 providing a modulated carrier frequency. A cathode follower tube 85 has the grid 86 thereof connected across the impedance for transmission of a signal through a tuned amplifier 87 to a meter 88. The follower tube 85 includes an anode 89 and a cathode 90, the latter being provided with a resistor 91 connected to ground and to the other terminal of the impedance 81.

When the sub-miniature diode 78 is inserted between the pole pieces of the magnet 77 and the system is operated, the electron flow between the cathode and anode of the tube 78 is reduced by the effect of the strong magnetic field thereon. Consequently, a lower signal is developed across the impedance 81 and the strength of this signal can be calibrated by the meter 88 to provide a direct reading on the strength of the magnetic field of the magnet 77. Where used with an electro-magnet, the system may be a permanent part of the magnet unit and will provide a continuous strong signal when the magnet itself is not in operation. The modifications of FIG. 2 can be used in the system of FIG. 7.

This application is a continuation-in-part of my copending application Serial No. 747,937, filed July 11, 1958, now abandoned.

Since certain further changes can be made in the foregoing circuits and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. An electric circuit for use in measuring an electrical signal, said circuit comprising, in combination, an essentially unidirectional conducting electric valve having a non-linear voltage-current characteristic in the conduction range, said valve having spaced electrodes, impedance means connected in series circuit relation with said valve, alternating current generating means connected across the series connected valve and impedance means and applying thereto a relatively high carrier frequency square wave modulated by a relatively low frequency, means active on said valve to affect the current established therein by said generating means to produce a measurable signal, and amplification means deriving its control signal from said impedance means and tuned to the fundamental component of the low frequency square wave modulation signal.

2. The electric circuit of claim 1 wherein said electric valve is a photosensitive device for producing an electric signal as a function of radiant energy impinging thereon.

3. The electric circuit of claim 1, wherein said valve is in the form of a sealed vessel provided with means supplying gaseous material, and indicating means connected to the output of said amplification means to measure said output as a function of gaseous ion flow in said valve.

4. The electric circuit of claim 1 wherein said means active on said valve provides a magnetic field, said valve being so located in said field that electron flow in the valve is affected by said field, and indicating means connected to the output of said amplification means to measure said output as a function of the magnetic field strength.

5. The electric circuit of claim 1 wherein said valve is in the form of a sealed vessel provided with a passage connecting the same to a gas pressure or vacuum system, a grid intermediate said spaced electrodes, first biasing means terminating said grid with one of said spaced electrodes providing for electron flow therebetween, second biasing means connected to another of said spaced electrodes and providing for gas ion collection thereon as driven by said electron flow, and means connected to said amplification means to measure its output as a function of gaseous ion flow in said valve.

6. An electric circuit for use in measuring an electrical signal, said circuit comprising, in combination, an essentially unidirectional conducting electric valve having a non-linear voltage-current characteristic in the conduction range, said valve having spaced electrodes, impedance means connected in series circuit relation with said valve, alternating current generating means connected across the series connected valve and impedance means and applying thereto a relatively high carrier frequency square wave modulated by a relatively low frequency, means active on said valve to affect the current established therein by said generating means to produce a measurable signal, and amplification means deriving its control signal from said impedance means and tuned to the fundamental component of the low frequency square wave modulation signal, said impedance means having a value on the order of megohms and providing a relatively great signal to noise ratio with the circuit components involved and increasing the signal output voltage of the circuit.

7. The electric circuit of claim 6 wherein said electric valve is a photosensitive device for producing an electric signal as a function of radiant energy impinging thereon.

8. The electric circuit of claim 6 wherein said valve is in the form of a sealed vessel provided with means supplying gaseous material, and indicating means connected to the output of said amplification means to measure said output as a function of gaseous ion flow in said valve.

9. The electric circuit of claim 6 wherein said valve is in the form of a sealed vessel provided with means supplying gaseous material, said spaced electrodes comprising first and second electrodes and a third electrode constituting electron flow collection means intermediate said first and second spaced electrodes, means connected to said first electrode and said third electrode providing for electron flow therebetween, biasing means connected to said second electrode providing for gaseous ion collection thereon as driven by said electron flow, said impedance means being connected in series circuit relation with said valve through said electron flow collection means and said second electrode, and means connected to said amplification means to measure its output as a function of gaseous ion flow in said valve.

10. An electric circuit for use in measuring an electrical signal, said circuit comprising, in combination, an essentially unidirectional conducting electric valve having a non-linear voltage-current characteristic in the conduction range, said valve having spaced electrodes, impedance means connected in series circuit relation with said valve, alternating current generating means connected across the series connected valve and impedance means and applying thereto a relatively high carrier frequency square wave modulated by a relatively low frequency, means active on said valve to affect the current established therein by said generating means to produce a measurable signal, means including a circuit tuned to said relatively high frequency and interposed between said alternating current generating means and said series connected valve and impedance means and preventing the application of the modulating frequency to said impedance means, and amplification means deriving its control signal from said impedance means and tuned to the fundamental component of the low frequency square wave modulation signal.

11. An electric circuit for use in measuring an electrical signal, said circuit comprising, in combination, an essentially unidirectional conducting electric valve having a non-linear voltage-current characteristic in the conduction range, said valve having spaced electrodes, impedance means connected in series circuit relation with said valve, alternating current generating means connected across the series connected valve and impedance means and applying thereto a relatively high carrier frequency square wave modulated by a relatively low frequency, means active on said valve to affect the current established therein by said generating means to produce a measurable signal, means including a circuit tuned to said relatively high frequency and interposed between said alternating current generating means and said series connected valve and impedance means and preventing the application of the modulating frequency to said impedance means, and amplification means deriving its control signal from said impedance means and tuned to the fundamental component of the low frequency square wave modulation signal, said impedance means having a value on the order of megohms and providing a relatively great signal to noise ratio with the circuit components involved and increasing the signal output voltage of the circuit.

12. An electric circuit for use in measuring an electrical signal, said circuit comprising, in combination, an essentially unidirectional conducting electric valve having a non-linear voltage-current characteristic in the conduction range, said valve having spaced electrodes, impedance means connected in series circuit relation with said valve, alternating current generating means connected across the series connected valve and impedance means and applying thereto a relatively high carrier frequency square wave modulated by a relatively low frequency, means active on said valve to affect the current established therein by said generating means to produce a measurable signal, means including a circuit tuned to said relatively high frequency and interposed between said alternating current generating means and said series connected valve and impedance means and preventing the application of the modulating frequency to said impedance means, said impedance means having a value on the order of megohms and providing a relatively great signal to noise ratio with the circuit components involved and increasing the signal output voltage of the circuit, and measuring means connected across said impedance means; said measuring means including a cathode follower having an anode, a grid connected to one terminal of said impedance means, a cathode, and a resistor connected between said cathode and another terminal of said impedance means, and amplification means deriving its control signal from said impedance means and tuned to the fundamental component of the low frequency square wave modulation signal and connected in series with a meter with the series connected amplifier and meter being connected across said resistor; and a low pass filter circuit interposed between said one terminal of said impedance means and said grid and preventing application of the carrier frequency thereto.

13. The electric circuit of claim 12 wherein the amplifier is a narrow band amplifier.

14. The electric circuit of claim 12 wherein the low pass filter circuit comprises series connected resistance and capaitance means.

15. The eletric circuit of claim 12 wherein said electric valve is a photosensitive device for producing an electric signal as a function of radiant energy impinging thereon.

No references cited.